United States Patent
Liang et al.

(10) Patent No.: US 12,444,420 B2
(45) Date of Patent: Oct. 14, 2025

(54) AUDIOBOOK VISUAL AID ASSISTANCE

(71) Applicant: INTERNATIONAL BUSINESS MACHINES CORPORATION, Armonk, NY (US)

(72) Inventors: Yang Liang, Beijing (CN); Hamid Majdabadi, Ottawa (CA); Manjunath Ravi, Georgetown, TX (US); Ravithej Chikkala, Pflugerville, TX (US); Su Liu, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 272 days.

(21) Appl. No.: 18/308,166

(22) Filed: Apr. 27, 2023

(65) Prior Publication Data

US 2024/0363116 A1    Oct. 31, 2024

(51) Int. Cl.
*G10L 15/26*    (2006.01)
*G10L 15/04*    (2013.01)

(52) U.S. Cl.
CPC .............. *G10L 15/26* (2013.01); *G10L 15/04* (2013.01)

(58) Field of Classification Search
None
See application file for complete search history.

(56) References Cited

U.S. PATENT DOCUMENTS

| | | | |
|---|---|---|---|
| 8,355,514 B2 | 1/2013 | Rhoads | |
| 8,973,153 B2 | 3/2015 | Gilzean et al. | |
| 9,070,369 B2 | 6/2015 | Cox et al. | |
| 9,620,147 B2 | 4/2017 | Deshmukh et al. | |
| 9,729,907 B2 | 8/2017 | McCue et al. | |
| 10,140,310 B1 * | 11/2018 | Kendall | G06F 16/685 |
| 10,891,969 B2 | 1/2021 | Huang et al. | |

(Continued)

FOREIGN PATENT DOCUMENTS

| JP | 0981590 A | 3/1997 |
|---|---|---|
| WO | 2020/014223 A1 | 1/2020 |

OTHER PUBLICATIONS

Kozlowski, "Global Audiobook Trends and Statistics for 2017", Good e-Reader, Dec. 18, 2016, 21 pages, https://goodereader.com/blog/digital-publishing/audiobook-trends-and-statistics-for-2017.

(Continued)

*Primary Examiner* — Neeraj Sharma
(74) *Attorney, Agent, or Firm* — Steven M. Bouknight (57) ABSTRACT

A method for automatically generating, correlating, and presenting visual content along with an audio stream associated with an audiobook is provided. The method may further include, in response to receiving an audio stream, automatically segmenting the audio stream into audio segments. The method may also include automatically identifying keywords, topics, and entities associated with each audio segment. The method may further include automatically identifying and retrieving visual content related to the identified keywords, topics, and entities of each audio segment from a visual content repository. The method may also include automatically integrating the identified and retrieved visual content with an audio segment. The method may further include automatically generating and displaying the visual content on the display at the designated time during play of the audio stream.

20 Claims, 5 Drawing Sheets

(56) References Cited

U.S. PATENT DOCUMENTS

| | | | |
|---|---|---|---|
| 10,957,304 B1* | 3/2021 | Krein | G06F 40/253 |
| 11,017,015 B2 | 5/2021 | Han et al. | |
| 2003/0158737 A1 | 8/2003 | Csicsatka | |
| 2009/0119108 A1* | 5/2009 | Noh | G10L 13/047 |
| | | | 704/260 |
| 2011/0246175 A1* | 10/2011 | Yi | G06F 40/40 |
| | | | 704/3 |
| 2012/0041765 A1* | 2/2012 | Chien | G10L 13/00 |
| | | | 704/260 |
| 2012/0218287 A1* | 8/2012 | McWilliams | G06F 15/0291 |
| | | | 345/619 |
| 2012/0245721 A1* | 9/2012 | Story, Jr. | G06F 3/04842 |
| | | | 700/94 |
| 2014/0163980 A1 | 6/2014 | Tesch et al. | |
| 2015/0169572 A1* | 6/2015 | Taubman | G06F 16/5854 |
| | | | 707/723 |
| 2018/0329582 A1 | 11/2018 | Clediere et al. | |
| 2019/0034412 A1* | 1/2019 | Gupta | G06V 30/194 |
| 2019/0196675 A1* | 6/2019 | German | G06V 30/40 |
| 2020/0013380 A1* | 1/2020 | Kakoyiannis | G06F 16/61 |
| 2022/0129123 A1* | 4/2022 | Nair | G06F 8/38 |

OTHER PUBLICATIONS

Learning Ally, "The Benefits of Audiobooks", accessed on Mar. 20, 2023, 7 pages, https://learningally.org/About-US/Why-Audiobooks.

Sonali Jain, Saksham, "Accessible Audio Books for Blind and Visually Impaired", Eyeway Newsletter, Accessed Mar. 20, 2023, 6 pages, http://www.eyeway.org/?q=accessible-audio-books-blind-and-visually-impaired.

The Yale Center for Dyslexia & Creativity, "Dyslexia FAQ", accessed on Mar. 20, 2023, 2 pages, http://dyslexia.yale.edu/dyslexia/dyslexia-faq/#.

Wikipedia, "Podcast", accessed Mar. 21, 2023, 8 pages, https://en.wikipedia.org/wiki/Podcast.

International Searching Authority, "Notification of Transmittal of the International Search Report and the Written Opinion of the International Searching Authority, or Declaration," Patent Cooperation Treaty, Jun. 5, 2024, 13 pages, International Application No. PCT/EP2024/058529.

* cited by examiner

AUDIOBOOK VISUAL AID ASSISTANCE

BACKGROUND

The present invention relates generally to the field of computing, and more specifically, to providing real-time and correlated visual content for an audio stream associated with an audiobook on one or computing devices.

Generally, an audiobook (or a talking book) may include a recording of a audio content associated with a book or other work that is read aloud and provided in any suitable audio format. However, while audiobooks may be distributed on any audio format available including records, cassette tapes, and CDs, a current and most common format for consuming audiobooks are in the form of downloadable digital formats (e.g. mp3, windows media audio.wma, advanced audio coding .aac, etc.), solid state preloaded digital devices in which the audio content is preloaded and possibly sold together with a hardware computing device, and various cloud computing applications that include a digital library of audiobooks. Thus, in one example, a user may listen to an audiobook by simply accessing a given computer application that may include the digital library of audiobooks for a user's listening consumption. Audiobooks are considered a valuable tool because of this format, which unlike traditional books or general video programming, one can listen to an audiobook while doing other tasks.

SUMMARY

A method for automatically generating, correlating, and presenting visual content along with an audio stream associated with an audiobook is provided. The method may further include, in response to receiving the audio stream, automatically segmenting the audio stream into audio segments. The method may also include automatically identifying keywords, topics, and entities associated with each audio segment associated with the audio stream. The method may further include automatically identifying and retrieving visual content related to the identified keywords, topics, and entities of each audio segment from a visual content repository. The method may also include automatically integrating the identified and retrieved visual content with an audio segment, whereby integrating the identified and retrieved visual content with an audio segment further comprises identifying a display for the visual content, and automatically customizing and synchronizing presentation of the visual content on the display at a designated time correlated with audio content comprising the identified keywords, the topics, and the entities of the audio segment that relate to the visual content. The method may further include automatically generating and displaying the visual content on the display at the designated time during play of the audio stream.

A computer system for automatically generating, correlating, and presenting visual content along with an audio stream associated with an audiobook is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may further include, in response to receiving the audio stream, automatically segmenting the audio stream into audio segments. The method may also include automatically identifying keywords, topics, and entities associated with each audio segment associated with the audio stream. The method may further include automatically identifying and retrieving visual content related to the identified keywords, topics, and entities of each audio segment from a visual content repository. The method may also include automatically integrating the identified and retrieved visual content with an audio segment, whereby integrating the identified and retrieved visual content with an audio segment further comprises identifying a display for the visual content, and automatically customizing and synchronizing presentation of the visual content on the display at a designated time correlated with audio content comprising the identified keywords, the topics, and the entities of the audio segment that relate to the visual content. The method may further include automatically generating and displaying the visual content on the display at the designated time during play of the audio stream.

A computer program product for automatically generating, correlating, and presenting visual content along with an audio stream associated with an audiobook is provided. The computer program product may include one or more computer-readable storage devices and program instructions stored on at least one of the one or more tangible storage devices, the program instructions executable by a processor. The computer program product may include program instructions to, in response to receiving the audio stream, automatically segment the audio stream into audio segments. The computer program product may also include program instructions to automatically identify keywords, topics, and entities associated with each audio segment associated with the audio stream. The computer program product may further include program instructions to automatically identify and retrieve visual content related to the identified keywords, topics, and entities of each audio segment from a visual content repository. The computer program product may also include program instructions to automatically integrate the identified and retrieved visual content with an audio segment, whereby integrating the identified and retrieved visual content with an audio segment further comprises identifying a display for the visual content, and automatically customizing and synchronizing presentation of the visual content on the display at a designated time correlated with audio content comprising the identified keywords, the topics, and the entities of the audio segment that relate to the visual content. The computer program product may also include program instructions to automatically generate and display the visual content on the display at the designated time during play of the audio stream.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate generally to the field of computing, and more particularly, to automatically generating, correlating, and presenting visual content along with an audio stream associated with an audiobook. Specifically, the present invention may improve the technical field associated with audio streaming, including audiobooks, by automatically and dynamically identifying visual content to be presented with audio content from an audio stream. For example, the present invention may automatically identify keywords, topics, and entities associated with the audio stream. Thereafter, the present invention may use the identified keywords, topics, and entities to identify and correlate visual content with the audio content comprising the identified keywords, topics, and entities. As such, responsive to playing the audio stream, the present invention may automatically integrate the identified and retrieved visual content into the audio stream and display the visual content on at least one computing device at a designated time during play of the audio stream.

As previously described, an audiobook may include a recording of a book or other work that is read aloud and provided in any suitable audio format. Furthermore, as previously described, audiobooks may be distributed in any such audio format but are currently most prevalent on downloadable digital formats, solid state preloaded digital devices in which the audio content is preloaded and possibly sold together with a hardware computing device, and various cloud computing applications that include a digital library of audiobooks. Thus, in one example, a user may listen to an audiobook by simply accessing via a smartphone a given computer application that may include a digital library of audiobooks for a user's listening consumption on the smartphone. While audiobooks are considered a valuable tool because of their format, mostly due to a user's ability to listen to an audiobook while performing other tasks, visual content and visual aids still have use in providing a better understanding and more clarification for different types of content in audio format where simply receiving audio can be lacking.

For example, while actively listening to an audiobook, a user may still want to view interesting pictures that a physical book copy typically has to offer. Furthermore, it may also be useful for a user to visualize certain content such as mathematical formulas, chemical equations, and physics laws while listening to audiobooks that include such content. In a further example, an audiobook based on a comic book (i.e. a publication typically consisting of art in the form of sequential juxtaposed panels that represent individual scenes) may also have the extra added benefit of images presented along with the audio stream of the audiobook. Accordingly, a problem with the current audiobook industry is its sole emphasis on the audio content and simple reading of written lines aloud.

As such, it may be advantageous, among other things, to provide a method, computer system, and computer program product for automatically generating, correlating, and presenting visual content along with an audio stream associated with an audiobook on one or computing devices. Specifically, in response to solely/strictly receiving audio content that includes the audio stream from the audiobook, the method, computer system, and computer program product may segment the audio stream into audio segments. Then, using natural language processing, the method, computer system, and computer program product may automatically identify keywords, topics, and entities associated with each audio segment from the audio segments. Next, for an audio segment, the method, computer system, and computer program product may automatically identify and retrieve visual content related to the keywords, topics, and entities of the audio segment from a visual content repository. Thereafter, the method, computer system, and computer program product may automatically integrate the identified and retrieved visual content with the audio segment, whereby integrating the identified and retrieved visual content with the audio segment further includes identifying a display for the visual content, and customizing and synchronizing presentation of the visual content on the display at a designated time correlated with audio content comprising the keywords, topics, and entities in the audio segment that relate to the visual content. Then, the method, computer system, and computer program product may generate and display the visual content on at least one computing device at the designated time during play of the audio stream.

The present invention may be a system, a method, and/or a computer program product at any possible technical detail level of integration. The computer program product may include a computer readable storage medium (or media) having computer readable program instructions thereon for causing a processor to carry out aspects of the present invention.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to determine whether directional input is received along with a query and, accordingly, adjust presented display content to include a referenced object in a center of a screen of a primary device.

Figure 1:
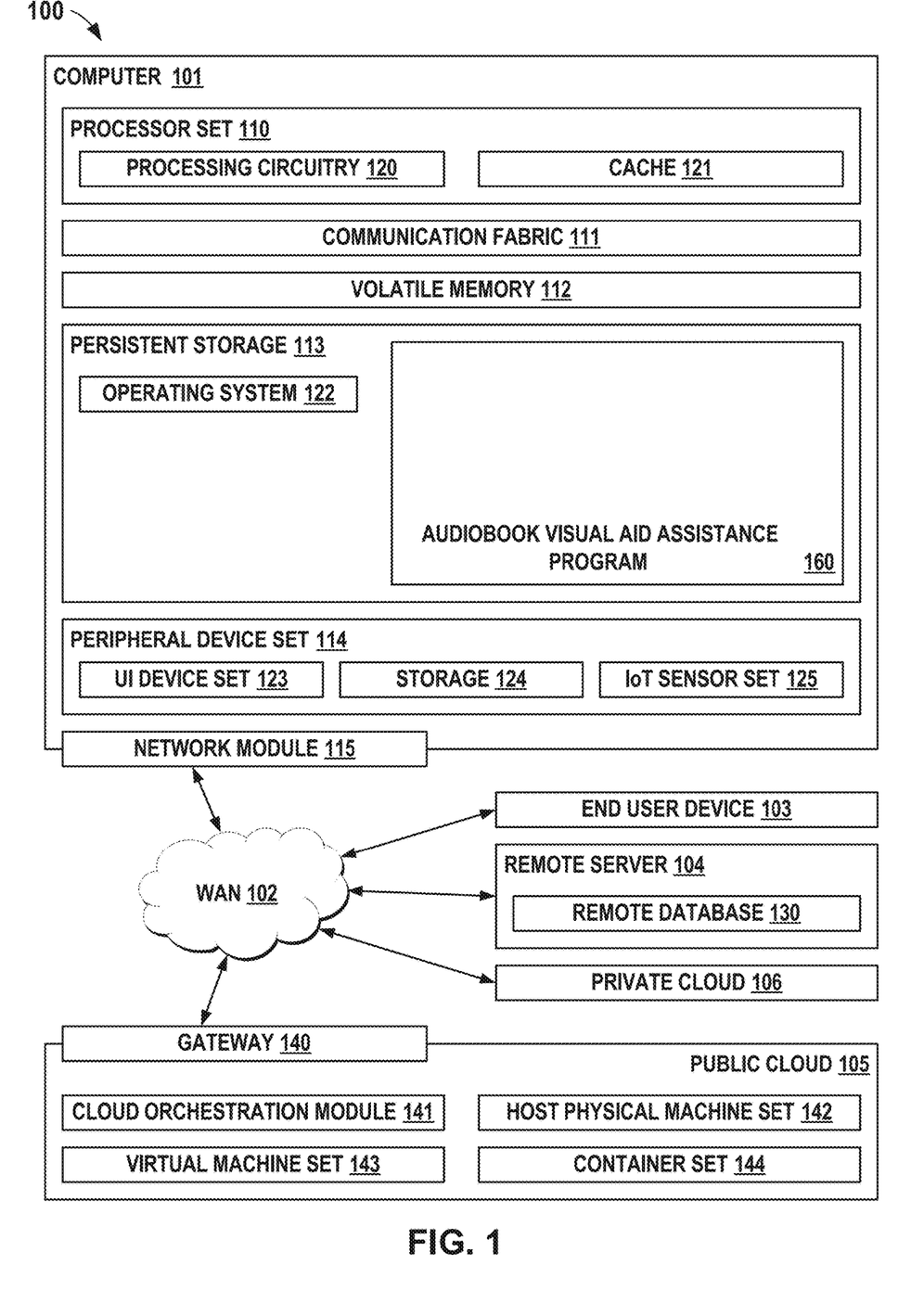
FIG. 1 illustrates an exemplary computing environment according to one embodiment.

Referring to FIG. 1, an exemplary computing environment 100 is depicted, according to at least one embodiment. Computing environment 100 contains an example of an environment for the execution of at least some of the computer code involved in performing the inventive methods, such as an audiobook visual aid assistance program 160. In addition to block 160, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 160, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer (such as a wearable headset), mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 160 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory 112 is characterized by random access, but this is not required unless affirmatively indicated. In computer 101, the volatile memory 112 is located in a single package and is internal to computer 101, but, alternatively or additionally, the volatile memory 112 may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage 113 allows writing of data, deletion of data and re-writing of data. Some familiar forms of persistent storage 113 include magnetic disks and solid state storage devices. Operating system 122 may take several forms, such as various known proprietary operating systems or open source Portable Operating System Interface type operating systems that employ a kernel. The code included in block 160 typically includes at least some of the computer code involved in performing the inventive methods.

Peripheral device set 114 includes the set of peripheral devices of computer 101. Data communication connections between the peripheral devices 114 and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles, headsets, and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database), this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector and/or accelerometer.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN 102 and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments the private cloud 106 may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

According to the present embodiment, the audiobook visual aid assistance program 160 may be a program/code capable of providing a method, computer system, and computer program product for automatically generating, correlating, and presenting visual content along with an audio stream associated with an audiobook. Specifically, in response to solely/strictly receiving audio content that includes the audio stream from the audiobook, the audiobook visual aid assistance program 160 may segment the audio stream into audio segments. Then, using natural language processing, the audiobook visual aid assistance program 160 may automatically identify keywords, topics, and entities associated with each audio segment from the audio segments. Next, for an audio segment, the audiobook visual aid assistance program 160 may automatically identify and retrieve visual content related to the keywords, topics, and entities of the audio segment from a visual content repository. Thereafter, the audiobook visual aid assistance program 160 may automatically integrate the identified and retrieved visual content with the audio segment, whereby integrating the identified and retrieved visual content with the audio segment further includes identifying a display for the visual content, and customizing and synchronizing presentation of the visual content on the display at a designated time correlated with audio content comprising the keywords, topics, and entities in the audio segment that relate to the visual content. Then, the method, computer system, and computer program product may generate and display the visual content on the display at the designated time during play of the audio stream.

Furthermore, notwithstanding depiction in computer 101, the audiobook visual aid assistance program 160 may be stored in and/or executed by, individually or in any combination, with end user device 103, remote server 104, public cloud 105, and private cloud 106. The audiobook visual aid assistance program is explained in further detail below with respect to FIGS. 2-5.

Figure 2:
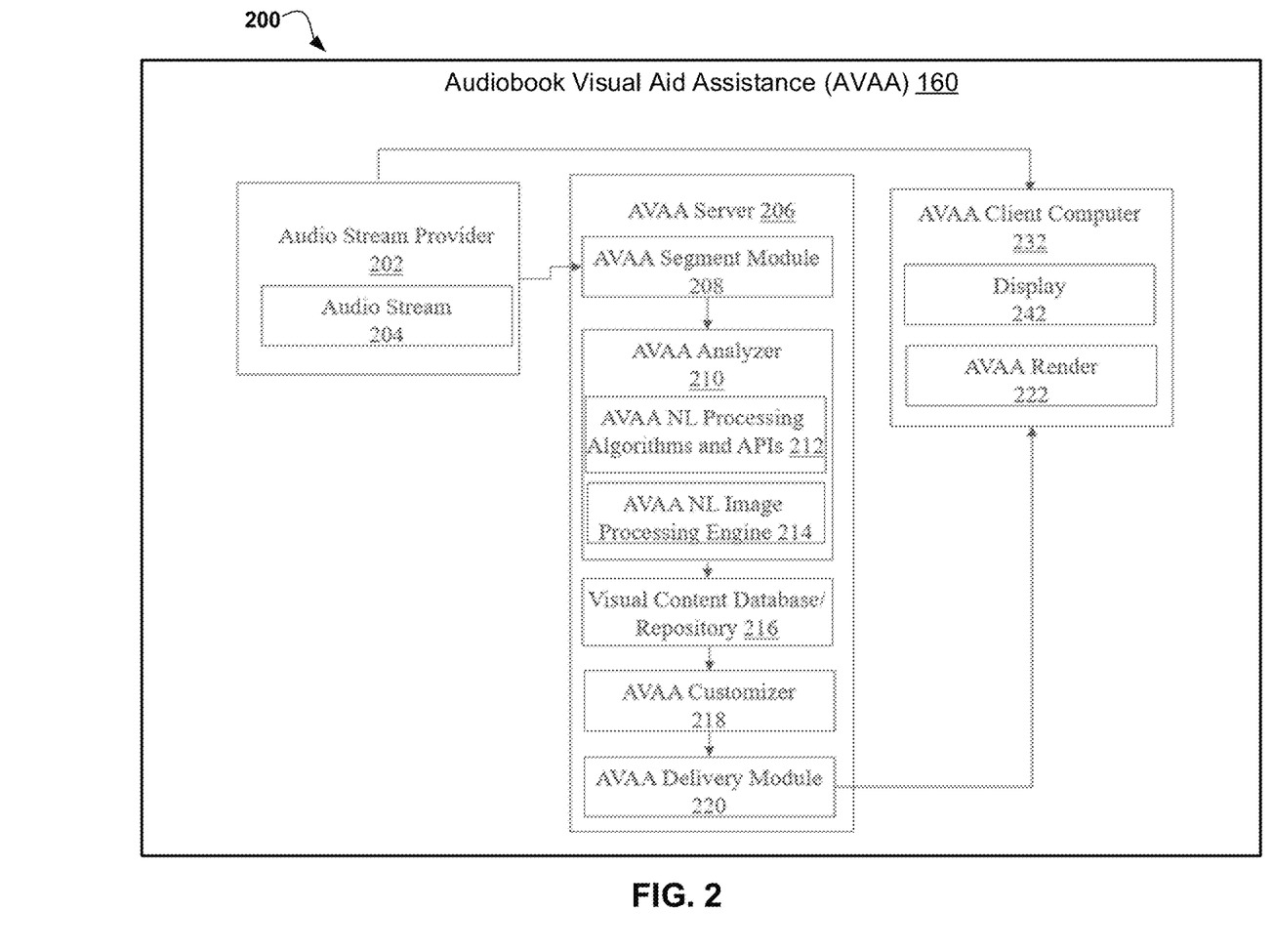
FIG. 2 is a system architecture and an expanded view of components 200 associated with a program for automatically generating, correlating, and presenting visual content along with an audio stream associated with an audiobook according to one embodiment.

Referring now to FIG. 2, a system architecture and an expanded view of components 200 associated the audiobook visual aid assistance (hereinafter AVAA) program 160 is depicted. According to one embodiment, the AVAA program 160 may be a standalone audiobook service and/or may be integrated with an audio stream provider 202. Specifically, according to one embodiment, the AVAA program 160 may be an application plugin that provides features herein disclosed to the audio stream provider and/or extends functionality of an existing audio stream provider based on the features herein disclosed. An example of an audio stream provider 202 may include Audible® (Audible and all Audible-based trademarks and logos are trademarks or registered trademarks of Audible, Inc. and/or its affiliates). Furthermore, the AVAA program 160 may include various components as depicted in FIG. 2, such as: AVAA server 206, AVAA segment module 208. AVAA analyzer 210, AVAA natural language (NL) processing application programming interface (API) 212, AVAA NL image processing engine 214, visual content repository/database 216, AVAA customizer 218, AVAA delivery module 220, AVAA client computer 232 (which may be computer 101 as depicted in FIG. 1) that further includes AVAA render 222 and display 242. Each component may include programming code and/or algorithms for performing operations of the AVAA program 160.

Figure 3:
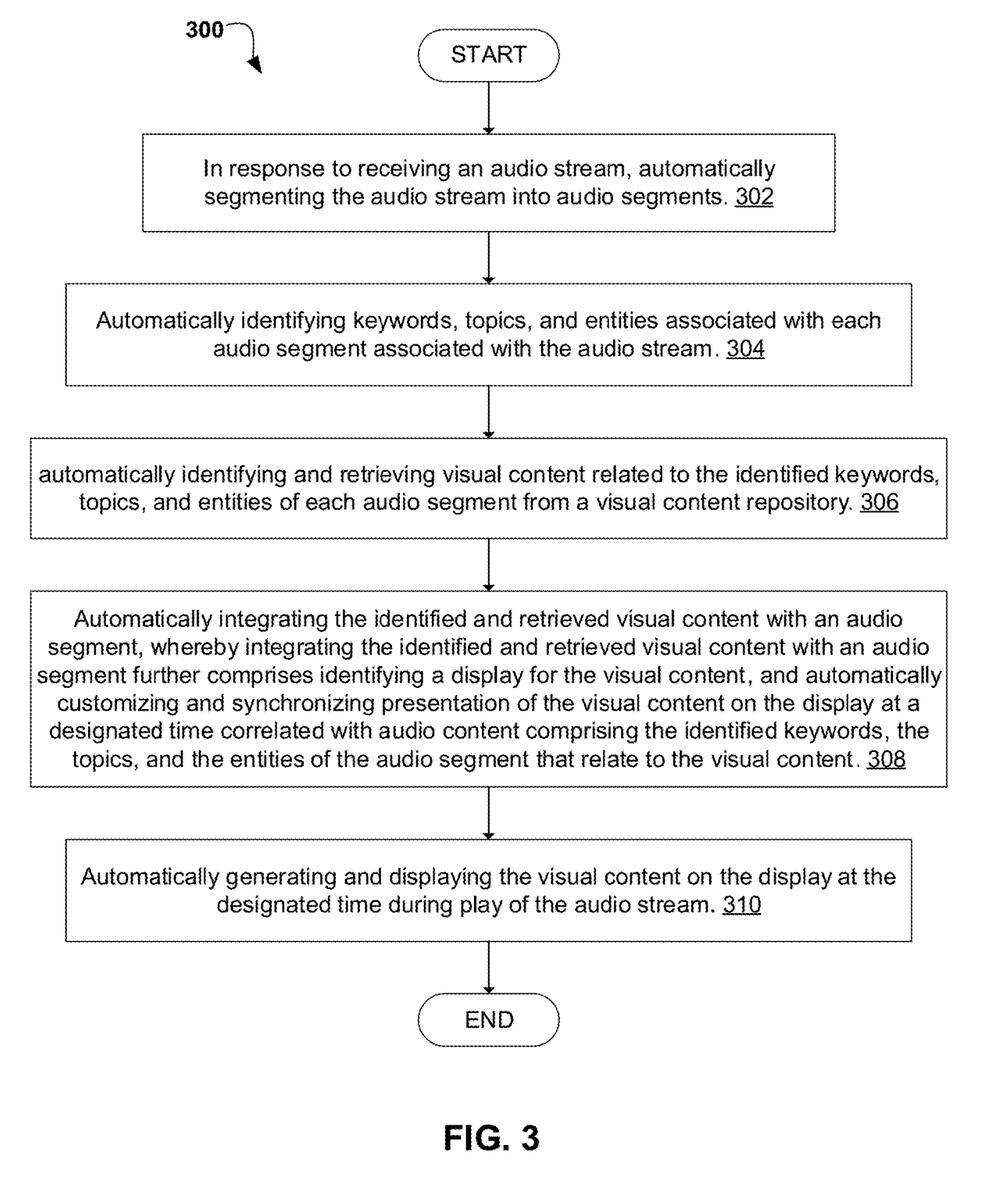
FIG. 3 is an operational flowchart for automatically generating, correlating, and presenting visual content along with an audio stream associated with an audiobook according to one embodiment.

Referring now to FIG. 3, an operational flowchart 300 for automatically generating, correlating and presenting visual content along with an audio stream 204 of an audiobook on the AVAA client computer 232 is depicted. The operational flowchart 300 will be described with reference to FIG. 2 and the system architecture and components 200 (FIG. 2) of the AVAA program 160 that includes the various components described above. According to one embodiment, in response to receiving the audio stream 204 from an audio provider 202, the AVAA program 160 may begin automatically processing the audio stream 204 to, in turn, automatically identify the visual content to be presented with the audio stream 204 on the AVAA client computer 232.

More specifically, and as depicted at 302 in FIG. 3, in response to receiving the audio stream 204 from the audio stream provider 202, the AVAA program 160 may begin processing the audio stream 204 by first segmenting the audio stream 204 into audio segments using the AVAA segment module 208. According to one embodiment, and similar to text segmentation in natural language processing (NLP), the AVAA program 160 may segment the audio stream 204 into audio segments by dividing audio content and corresponding text associated with the audio stream 204 into coherent and semantically meaningful segments which are contiguous. For example, the AVAA segment module 208 may include NLP speech-to-text algorithms and other NLP algorithms to divide the audio content and corresponding text into meaningful units such as words, sentences, and/or topics which may be used in summarization, context understanding, and question-answering of the audio content.

Next, at 304, the AVAA program 160 may automatically identify keywords, topics, and entities associated with each audio segment from the audio stream 204. More specifically, the AVAA program 160 may use the AVAA analyzer 210, which may further include AVAA natural language (NL) processing algorithms and APIs 212, to extract keywords and phrases from an audio segment that may identify entities (such as people, places, and things) as well as certain topics in the audio segment. For example, an educational audiobook such as a physics audiobook may include audio content describing laws of physics as well as mathematical problems and equations, and nonfiction audiobooks as well as fictional audiobooks may include audio content that depicts characters, events, scenery, and discussions of different topics. As such, the AVAA natural language (NL) processing algorithms and APIs 212 may include speech-to-text algorithms and NL processing techniques such as keyword extraction, sentiment analysis, context analysis, named entity recognition, summarization, topic modeling, text classification, etc. to identify and classify keywords and phrases in an audio segment.

Then, at 306, the AVAA program 160 may automatically identify and retrieve visual content related to the keywords, topics, and entities of the audio segments in the audio stream 204 from a visual content repository/database 216. More specifically, the AVAA program 160 may use the AVAA analyzer 210, which may further include AVAA natural language (NL) image processing engine 214, to use the extracted keywords and phrases from the audio segment in a search (such as in a search query and search engine that may be associated with the AVAA NL image processing engine 214) to the visual content repository/database 216 to identify visual content in the visual content repository/database 216 that may match the extracted keywords and phrases. According to one embodiment, the visual content repository/database 216 may be a database that may be pre-populated with images and other visual content (videos, GIFs, etc.). Furthermore, according to one embodiment, the visual content repository/database 216 may be a database that is pre-populated with images and other visual content from copies of books that may be associated with audiobooks. For example, certain books for which corresponding audiobooks are based may include visual content and that visual content may be stored on the visual content repository/database 216. Also, according to one embodiment, the visual content repository/database 216 may include visual content that may be retrieved from other sources such as from other databases and/or from other networks including the internet. The AVAA natural language (NL) image processing engine 214 may also include natural language processing techniques to assist in identifying images matching keywords. According to one embodiment, the AVAA natural language (NL) image processing engine 214 may also include machine learning algorithms and models. As previously described, visual content may include images, videos, GIFs, and other types of visual imagery. For example, for an educational audiobook such as a physics audiobook, the AVAA program 160 may detect keywords describing an equation, and therefore, may identify an image having a visual representation of the equation so that a user may be able to view the equation. Also, for example, for nonfiction and fictional audiobooks that may include audio content that depicts different characters, events, scenery, and discussions of different topics, the AVAA program 160 may identify pictures of characters or historical figures associated with keywords in the audiobook, images of statistical graphs corresponding to information on a certain topic discussed in an audiobook, and video depicting certain events described in an audiobook.

According to one embodiment, automatically identifying and retrieving the visual content related to the keywords, topics, and entities of an audio segment from a visual content repository/database 216 may further include ranking the visual content and choosing a highest ranking visual content to display to a user. For example, the AVAA natural language (NL) image processing engine 214 may identify visual content matching the keywords and phrases associated with an audio segment whereby a match may be represented by a percentage. Also, according to one embodiment, the AVAA program 160 may consider presenting visual content that only matches keywords above a certain threshold percentage to present on AVAA client computer 232. For example, based on an analysis of an audio segment by the AVAA analyzer 210 using the natural language processing techniques and APIs as well as a subsequent search to identify visual content matching the audio content from the visual content repository/database 216, the AVAA program 160 may identify first visual content having a 30% match to the keywords and phrases, second visual content having a 86% match to the keywords and phrases, third visual content having a 96% match to the keywords and phrases, and fourth visual content also having a 96% match to the keywords and phrases. As previously described, a match may be determined by the AVAA program 160 using the AVAA natural language (NL) processing algorithms and APIs 212 and the AVAA natural language (NL) image processing engine 214 which may perform natural language analysis and image analysis based on the extracted keywords and phrases associated with the audio content such that the visual content (such as an image) may be analyzed in reference to the keywords including reference to a context, topic, sentiment, and other natural language processing analysis/techniques associated with the keywords in the audio content. Additionally, the AVAA program 160 may be configured with program/code, and/or may include machine learning, to identify visual content having a match above 80% to only be considered a match to the audio content. As such, the AVAA program 160 may determine that the first visual content previously described as having a 30% match is not considered a match to the audio content for which a search was conducted. Furthermore, and as previously described, the AVAA program 160 may identify highest ranking visual content to display to a user. Therefore, the third visual content and the fourth visual content (both having 96% matches) may be considered for presentation to the user instead of the second visual content (having an 86% match). Additionally, in response to detecting two or more matches having a same matching percentage, the AVAA program may identify at random which visual content to retrieve and present on the AVAA client computer 232. Therefore, in the case where the third visual content and the fourth visual content both have matches of 96% to the keywords and phrases associated with the audio content of an audio segment, the AVAA program may randomly choose (i.e. retrieve for presentation) one of the third and the fourth visual content.

Thereafter, at 308, the AVAA program 160 may automatically integrate the identified and retrieved visual content with the audio segment, whereby integrating the identified and retrieved visual content with the audio segment further includes identifying a display for the visual content, and customizing and synchronizing presentation of the visual content on the display at a designated time correlated with the audio content comprising the keywords, topics, and entities of the audio segment that relate to the visual content. As previously described at 306, the AVAA program 160 may identify visual content matching the keywords and phrases associated with an audio segment. Accordingly, in response to identifying the visual content to be displayed, the AVAA program 160 may use the AVAA customizer 218 to integrate the visual content with the audio by identifying a display to present the visual content, customizing the visual content to the display, and identifying a designated time to present the visual content that is synchronized with the audio content that includes the keywords, topics, entities related to the visual content. For example, the AVAA program 160 may automatically identify a display to present the visual content based on detecting a computing device that is used to access the audio stream 204. More specifically, for example, the AVAA program 160 may detect that a user is accessing the audio stream 204 on the AVAA client computer 232 which, as previously described, may be a computer such as computer 101 described in FIG. 1 (i.e. a personal computer, a laptop computer, a mobile phone device, a smartwatch, etc.). Therefore, the AVAA program 160 may identify the display 242 associated with the AVAA client computer 232 as the display to present the visual content. According to one embodiment, the AVAA program 160 may also include a user interface to enable user selection of a display to present the visual content. For example, an audio stream provider 202 and/or the AVAA program 160 may register one or more computing devices associated with a user to identify different devices that a user may use to access an audio stream 204. Furthermore, the AVAA program 160 may detect that a user may be accessing and listening to the audio stream 204 on a smartwatch, however, may prompt the user via the user interface to choose which computing device to display the visual content, whereby a chosen computing device may be different from the computing device that the user is accessing and listening to the audio stream 204.

Furthermore, and as previously described, the AVAA program 160 may customize the visual content to the display. According to one embodiment, the AVAA program 160 may customize the visual content by using the AVAA customizer 218 to adjust the visual content for different types of displays associated with different computing devices, such as AVAA client computer 232. For example, the AVAA program 160 may adjust the visual content by resizing the visual content (such as resizing an image including enlarging or downsizing an image), zooming in or out of the visual content, showing the visual content in different parts (for example, splitting an image) etc., to adjust the visual content to the type of display. More specifically, for example, the AVAA program 160 may detect that the audio stream 204 may be accessed via a smartwatch. As such, in response to identifying visual content to be displayed and determining that the visual content may need to be downsized or shown in different parts due to a diminutive display associated with the smartwatch, the AVAA program 160 may identify dimensions of the smartwatch display and adjust the visual content by, for example, adjusting a size of the visual content, zooming out of the visual content, and/or showing the visual content in different parts to adjust the visual content to the size of the smartwatch display.

Furthermore, and as previously described, the AVAA program 160 may identify a designated time to present the visual content that may be synchronized with the audio content that includes the keywords, topics, entities related to the visual content. For example, the AVAA program 160 may determine that audio content that includes a keyword and/or topic associated with the visual content may audibly be first presented at 1:36:47 into an audiobook that has a time length of 3:00:00. As such, the AVAA program 160 may determine using the AVAA delivery module 220 to deliver and present the visual content on the display of the AVAA client computer 232 at the designated time of 1:36:47, or according to one embodiment, may be configured to deliver and present the visual content a few seconds before the designated time. Also, according to one embodiment, the AVAA program 160 may present the visual content for a specified length of time. For example, and according to one embodiment, the AVAA program 160 may present the visual content for a length of time associated with a length of discussion of a topic in the audio segment. For example, the AVAA program 160 may detect a keyword introducing a topic that may be audibly presented at 1:36:47 and that topic may be discussed until 1:40:40. Therefore, the AVAA program may display the visual content associated with that topic at the designated time of 1:36:47 up until 1:40:40. According to one embodiment, the AVAA program 160 may display visual content associated with a keyword at a designated time up until another time where other visual content associated with another keyword is to be presented. For example, the AVAA program 160 may detect a first keyword introducing a topic that may be audibly presented at 1:36:47 and may present visual content associated with the first keyword at that designated time. Furthermore, the AVAA program 160 may detect that visual content corresponding to a second keyword is scheduled to be presented at 1:46:40. Therefore, the AVAA program may maintain displaying the visual content associated with the first keyword/topic from 1:36:47 until reaching the time of 1:46:40, whereby the AVAA program 160 may display the visual content corresponding to the second keyword.

In turn, and as depicted at 310 in FIG. 3, the AVAA program 160 may generate and display visual content on a display, such as display 242, at the designated time during the audio stream 204 of the audio segment, whereby the AVAA program 160 may use the AVAA render 222 to display the visual content on the display.

According to one embodiment, the AVAA program may perform steps 302-310 in FIG. 3 during a pre-processing stage and/or in real-time. Specifically, and as previously described, the AVAA program 160 may be a standalone audiobook service and/or may be integrated with an existing audio stream provider 202. More specifically, according to one embodiment, the AVAA program 160 may be an application plugin that provides features herein disclosed to the audio stream provider 202 and/or extends functionality of an existing audio stream provider 202 based on the features herein disclosed. For example, according to one embodiment, in response to detecting an upload of an audiobook from the audio stream provider 202 (for example, detecting the audio stream provider 202 providing a new audiobook, and therefore, uploading the new audiobook to the audio stream provider's 202 services), the AVAA program 160 may automatically pre-process the audiobook by automatically performing steps 302-310 to identify and prepare the visual content for the audio stream 204, and may store the identified and prepared visual content correlated with the audio stream 204 on AVAA server 206 to later present the visual content at a time when the audio stream 204 is accessed and played on a computing device. Also, according to one embodiment, the AVAA program 160 may perform real-time processing of an audio stream 204 in response to detecting a user accessing the audio stream 204. For example, in response to detecting a user accessing the audio stream 204 using the AVAA client computer 232 (such as by detecting a user clicking on the audio stream 204 and/or clicking a "play" button for the audio stream 204), the AVAA program may automatically initiate steps 302-310 in FIG. 3 to identify in real-time visual content associated with the audio stream 204.

Figure 4:
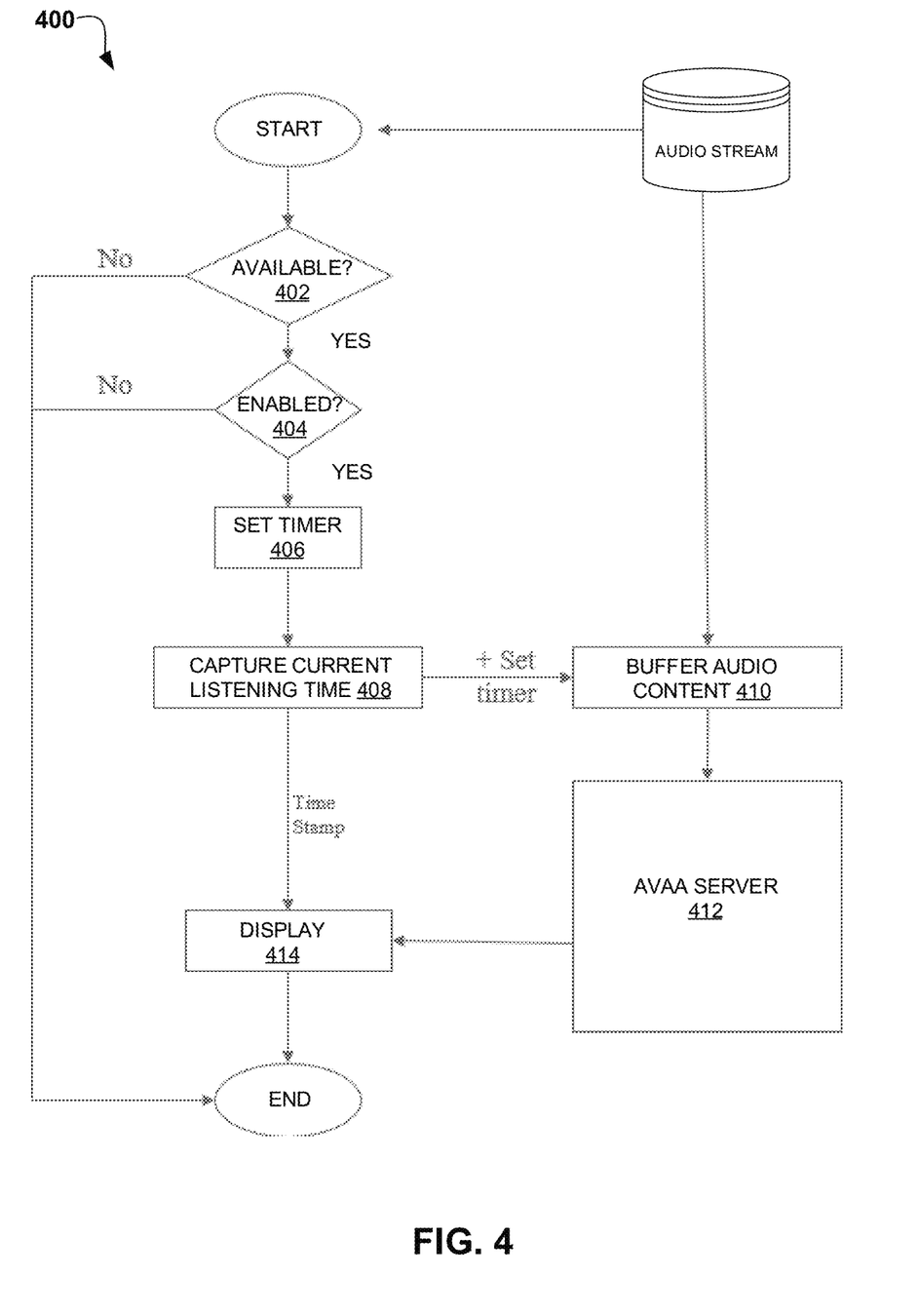
FIG. 4 is an operational flowchart illustrating an example real-time use case for automatically generating, correlating, and presenting visual content along with an audio stream of an audiobook on one or computing devices according to one embodiment.

Referring now to FIG. 4, an operational flowchart illustrating an example real-time use case 400 for the method, computer system, and computer program product for automatically generating, correlating, and presenting visual content along with an audio stream of an audiobook on one or computing devices according to one embodiment is depicted. Specifically, at 402, in response to detecting a user accessing an audiobook using the AVAA client computer 232, the AVAA program 160 may determine whether the audiobook is available for visual aid assistance (i.e. providing visual content). More specifically, according to one embodiment, not all audiobooks may be available for visual aid assistance which may further be based, for example, on certain restrictions from an audio service provider 202. As such, in response to determining that an audiobook is not available for visual aid assistance, the AVAA program 160 may not provide visual content to the audio stream 204. In response to determining that an audiobook is available for visual aid assistance, the AVAA program 160 may proceed to step 404.

At 404, and according to one embodiment, the AVAA program 160 may further determine whether to enable visual aid assistance for the accessed audiobook. Specifically, according to one embodiment, the AVAA program 160 may determine whether to provide visual content based on a user selection on a user interface. For example, while an audiobook may be indeed available for visual aid assistance as determined at step 402, the AVAA program 160 may present a user interface on the AVAA client computer 232 to further enable a user to select whether to include visual content with the audio stream 204. According to one embodiment, for example, the AVAA program 160 may prompt the user on the user interface with selectable options that may include a selectable "Yes" to enable visual content and a selectable "No" to not enable visual content. According to another example, the AVAA program 160 may also present on the user interface a toggle whereby the user may be able to toggle between providing visual content or not providing visual content. In response to determining that visual aid is enabled for the accessed audiobook, the AVAA program 160 may proceed to step 406.

Then, beginning at 406, the AVAA program 160 may prepare the audio content that is associated with the audio stream 204 for analysis. Specifically, and as depicted at step 406, the AVAA program 160 may analyze the audio content using a set timer whereby the set timer may set a time interval for analyzing audio content to, in turn, identify visual content that may be associated with keywords, topics, and entities within that time interval. Thus, the AVAA program 160 may use time intervals to incrementally analyze blocks of audio content (i.e. a block of data). For example, a time interval may include a time interval of 30 seconds, a time interval of 1 minute, a time interval of 2 minutes, a time interval of 1 chapter, a time interval of 2 chapters, etc. Therefore, in an example, the AVAA program 160 may receive an audio stream 204 with a total time length of 3 hours, and in response to receiving the audio stream 204, the AVAA program 160 may analyze the audio content in the audio stream 204 in 30-second time intervals based on a user's current listening time in the audio stream 204. In such case, for example, the set timer may be represented by a notation such as N+30 secs, whereby N represents the user's current listening time in the audio stream 204. Accordingly, and as depicted at step 408, the AVAA program 160 may capture the user's current listening time (which may begin at 0 secs), and consequently, may begin buffering/preloading (410) audio content from 0 to 30 seconds of the audio stream for analysis by the AVAA server at 412. Accordingly, as the user's current listening time incrementally progresses (i.e. from 0 sec to 1 sec, to 2 secs, to 3 secs, etc.), the AVAA program 160 may correspondingly and incrementally progress the time interval of the block audio content that is being analyzed such as by correspondingly and incrementally increasing the time interval from being between 0 and 31 seconds to between 1 and 31 seconds, between 2 and 32 seconds, between 3 and 33 seconds, etc.

Therefore, a set timer or time interval (406) may be used to analyze a block of audio content (i.e. block of data) within that time interval. In a further embodiment, the AVAA program 160 may include default programming/code and/or may use machine learning to set the time interval (set timer) based on a type or genre of the audiobook. For example, a block of audio content associated with an audiobook in the genre of fiction may be less difficult or less complicated to analyze (i.e. requiring less computing resources and/or less computing processing time to produce visual content for the block of fictional audio content) than a block of audio content associated with an audiobook in the genre of education. More specifically, for example, an educational audiobook that is based on a physics textbook may include more complicated and dense audio content that may describe different laws of physics and multiple mathematical equations/formulas, while a fictional audiobook based on a fictional story may include less complicated and simpler audio content that may include descriptions of characters and scenery. As such, because certain educational content may be more complicated to analyze (i.e. requiring more computing resources and/or taking more computer processing time to produce visual content), the AVAA program 160 may include and/or determine a set timer large enough to account for finding visual content based on educational audiobooks (such as by having a set timer of 1 minute instead of 30 seconds) to be able to process/analyze larger blocks of audio content associated with the educational audiobook in order to anticipate and prepare visual content for such audio content in a more efficient/timely manner. According to one embodiment, the AVAA program 160 may be configured with program/code to identify a type/genre of audiobook and/or may include machine learning to identify the type/genre and correspondingly determine the set timer based on the type/genre.

Figure 5:
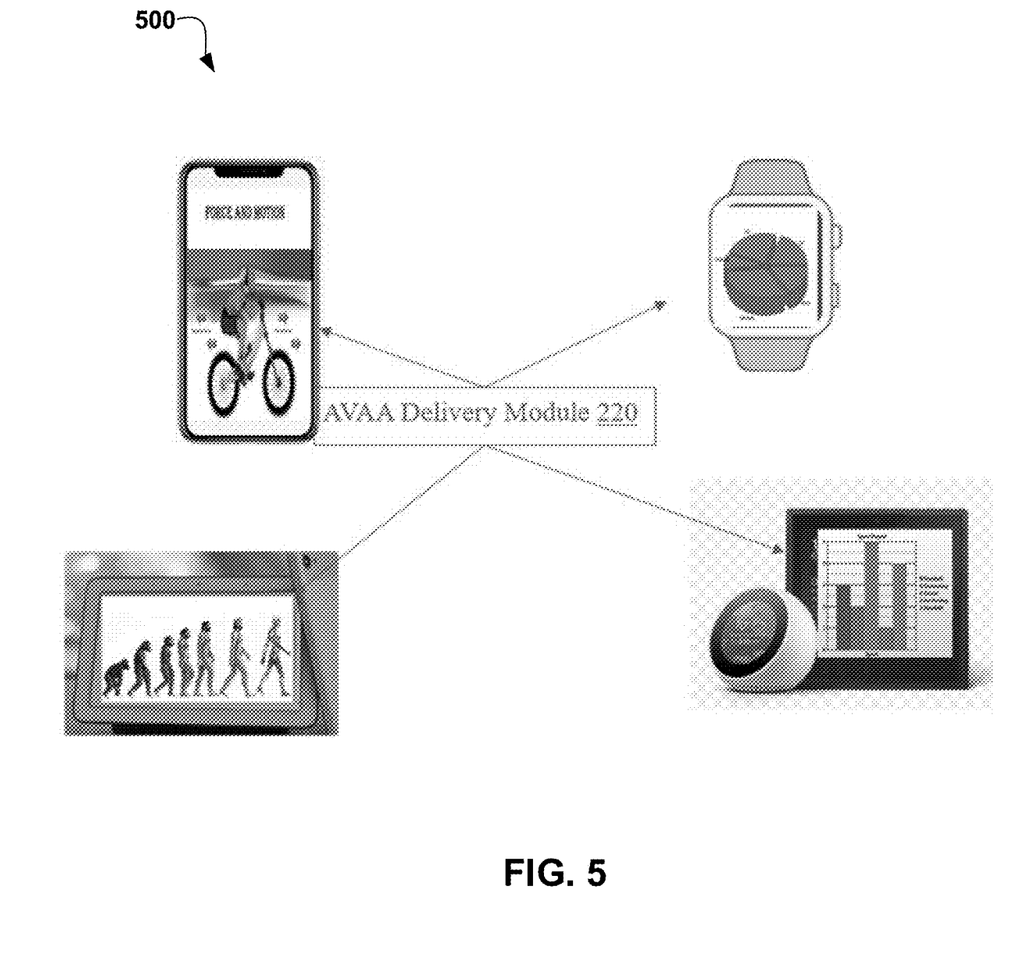
FIG. 5 is example diagram of computing devices provided visual content based on a program for automatically generating, correlating, and presenting visual content along with an audio stream of an audiobook according to one embodiment.

As such, based on the set timer (406) and the user's captured current listening time (408), the AVAA program 160 may accordingly buffer the audio content associated with the audiobook at step 410, whereby buffering may generally include a well-known process of preloading data into a reserved area of memory called a buffer. Specifically, in the context of streaming audio and the present invention, buffering may include downloading a certain amount of audio content (based on the set timer) for analysis before the audio content begins playing so that visual content may be presented along with the audio content. As such, and as depicted at step 412, the AVAA program 160 may perform the previously described steps 302-310 in FIG. 3 to automatically identify and correlate visual content along with an audio stream of an audiobook, and thereby, display the visual content at step 414 on one or computing devices. FIG. 5 depicts a further example of computing devices 500, whereby the AVAA delivery module 220 may provide the visual content to the one or more computing devices which may, in turn, render the visual content on a display via the AVAA render 222 as was previously described in FIG. 3.

It may be appreciated that FIGS. 2-5 provide only illustrations of one implementation and does not imply any limitations with regard to how different embodiments may be implemented. Many modifications to the depicted environments may be made based on design and implementation requirements.

As previously described, the present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Furthermore, machine learning as described herein may broadly refer to machine learning algorithms that learn from data. More specifically, machine learning is a branch of artificial intelligence that relates to algorithms such as mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as Naïve bias classifiers, logistic regression classifiers, ridge regression classifiers, random forest classifiers, least absolute shrinkage and selector (LASSO) classifiers, and support vector machines; (iv) clusters, such as k-means clusters, mean-shift clusters, and spectral clusters; (v) factorization machines, principal component analyzers and kernel principal component analyzers; and (vi) ensembles or other combinations of machine-learning models. Neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these.

What is claimed is:

1. A computer-implemented method for automatically generating, correlating, and presenting visual content along with an audio stream associated with an audiobook, comprising:
in response to receiving the audio stream, automatically segmenting the audio stream into audio segments;
automatically identifying keywords, topics, and entities associated with each audio segment associated with the audio stream;
automatically identifying and retrieving visual content related to the identified keywords, topics, and entities of each audio segment from a visual content repository;
automatically integrating the identified and retrieved visual content with an audio segment, whereby integrating the identified and retrieved visual content with an audio segment further comprises identifying a display for the visual content on a computing device from a plurality of different displays associated a plurality of different computing devices, and automatically customizing and synchronizing presentation of the visual content on the display at a designated time correlated with audio content comprising the identified keywords, the topics, and the entities of the audio segment that relate to the visual content, wherein the plurality of different displays associated the plurality of different computing devices further comprises at least one display associated with a corresponding computing device that is different from a given computing device that is used for accessing and listening the audio stream; and
automatically generating and displaying the visual content on the display at the designated time during play of the audio stream.

2. The computer-implemented method of claim 1, wherein automatically identifying and retrieving the visual content related to the keywords, the topics, and the entities of each audio segment from the visual content repository further comprises:
automatically using the identified keywords from the audio segment in a search query to identify visual content in the visual content repository matching the identified keywords, the topics, and the entities.

3. The computer-implemented method of claim 1, wherein the visual content repository comprises images, videos, and graphics interchange formats (GIFs).

4. The computer-implemented method of claim 1, wherein the visual content repository is populated from different databases and networks including internet.

5. The computer-implemented method of claim 1, wherein automatically identifying and retrieving the visual content related to the keywords, the topics, and the entities of each audio segment from the visual content repository further comprises:
ranking the visual content; and
selecting a highest ranking visual content to display for a given keyword, a given topic, and a given entity.

6. The computer-implemented method of claim 1, wherein automatically customizing and synchronizing the presentation of the visual content on the display further comprises:
automatically adjusting the visual content to the display based on a type of display associated with the computing device, wherein adjusting the visual content comprises at least one of resizing the visual content and presenting the visual content in different parts.

7. The computer-implemented method of claim 1, wherein automatically generating and displaying the visual content on the display at the designated time during play of the audio stream further comprises:
automatically presenting the visual content for a specified length of time.

8. A computer system for automatically generating, correlating, and presenting visual content along with an audio stream associated with an audiobook, comprising:
one or more processors, one or more computer-readable memories, one or more computer-readable tangible storage devices, and program instructions stored on at least one of the one or more computer-readable tangible storage devices for execution by at least one of the one or more processors via at least one of the one or more computer-readable memories, wherein the computer system is capable of performing a method comprising:
in response to receiving the audio stream, automatically segmenting the audio stream into audio segments;
automatically identifying keywords, topics, and entities associated with each audio segment associated with the audio stream;

automatically identifying and retrieving visual content related to the identified keywords, topics, and entities of each audio segment from a visual content repository;

automatically integrating the identified and retrieved visual content with an audio segment, whereby integrating the identified and retrieved visual content with an audio segment further comprises identifying a display for the visual content on a computing device from a plurality of different displays associated a plurality of different computing devices, and automatically customizing and synchronizing presentation of the visual content on the display at a designated time correlated with audio content comprising the identified keywords, the topics, and the entities of the audio segment that relate to the visual content, wherein the plurality of different displays associated the plurality of different computing devices further comprises at least one display associated with a corresponding computing device that is different from a given computing device that is used for accessing and listening the audio stream; and automatically generating and displaying the visual content on the display at the designated time during play of the audio stream.

9. The computer system of claim 8, wherein automatically identifying and retrieving the visual content related to the keywords, the topics, and the entities of each audio segment from the visual content repository further comprises:

automatically using the identified keywords from the audio segment in a search query to identify visual content in the visual content repository matching the identified keywords, the topics, and the entities.

10. The computer system of claim 8, wherein the visual content repository comprises images, videos, and graphics interchange formats (GIFs).

11. The computer system of claim 8, wherein the visual content repository is populated from different databases and networks including internet.

12. The computer system of claim 8, wherein automatically identifying and retrieving the visual content related to the keywords, the topics, and the entities of each audio segment from the visual content repository further comprises:

ranking the visual content; and selecting a highest ranking visual content to display for a given keyword, a given topic, and a given entity.

13. The computer system of claim 8, wherein automatically customizing and synchronizing the presentation of the visual content on the display further comprises:

automatically adjusting the visual content to the display based on a type of display associated with the computing device, wherein adjusting the visual content comprises at least one of resizing the visual content and presenting the visual content in different parts.

14. The computer system of claim 8, wherein automatically generating and displaying the visual content on the display at the designated time during play of the audio stream further comprises:

automatically presenting the visual content for a specified length of time.

15. A computer program product for automatically generating, correlating, and presenting visual content along with an audio stream associated with an audiobook, comprising:

one or more tangible computer-readable storage devices and program instructions stored on at least one of the one or more tangible computer-readable storage devices, the program instructions executable by a processor, the program instructions comprising:

in response to receiving the audio stream, automatically segmenting the audio stream into audio segments;

automatically identifying keywords, topics, and entities associated with each audio segment associated with the audio stream;

automatically identifying and retrieving visual content related to the identified keywords, topics, and entities of each audio segment from a visual content repository;

automatically integrating the identified and retrieved visual content with an audio segment, whereby integrating the identified and retrieved visual content with an audio segment further comprises identifying a display for the visual content on a computing device from a plurality of different displays associated a plurality of different computing devices, and automatically customizing and synchronizing presentation of the visual content on the display at a designated time correlated with audio content comprising the identified keywords, the topics, and the entities of the audio segment that relate to the visual content, wherein the plurality of different displays associated the plurality of different computing devices further comprises at least one display associated with a corresponding computing device that is different from a given computing device that is used for accessing and listening the audio stream; and automatically generating and displaying the visual content on the display at the designated time during play of the audio stream.

16. The computer program product of claim 15, wherein automatically identifying and retrieving the visual content related to the keywords, the topics, and the entities of each audio segment from the visual content repository further comprises:

automatically using the identified keywords from the audio segment in a search query to identify visual content in the visual content repository matching the identified keywords, the topics, and the entities.

17. The computer program product of claim 15, wherein the visual content repository comprises images, videos, and graphics interchange formats (GIFs) populated from different databases and networks including internet.

18. The computer program product of claim 15, wherein automatically identifying and retrieving the visual content related to the keywords, the topics, and the entities of each audio segment from the visual content repository further comprises:

ranking the visual content; and selecting a highest ranking visual content to display for a given keyword, a given topic, and a given entity.

19. The computer program product of claim 15, wherein automatically customizing and synchronizing the presentation of the visual content on the display further comprises:

automatically adjusting the visual content to the display based on a type of display associated with the computing device, wherein adjusting the visual content comprises at least one of resizing the visual content and presenting the visual content in different parts.

20. The computer program product of claim 15, wherein automatically generating and displaying the visual content on the display at the designated time during play of the audio stream further comprises:

automatically presenting the visual content for a specified length of time.

\* \* \* \* \*